US006958972B2

(12) United States Patent
Foltak

(10) Patent No.: US 6,958,972 B2
(45) Date of Patent: *Oct. 25, 2005

(54) MODULE FIRMWARE RECOVERY

(75) Inventor: Richard Foltak, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 10/633,003

(22) Filed: Jul. 31, 2003

(65) Prior Publication Data

US 2004/0153755 A1 Aug. 5, 2004

Related U.S. Application Data

(63) Continuation of application No. 09/346,557, filed on Jun. 30, 1999, now Pat. No. 6,606,298.

(51) Int. Cl.$^7$ .............................................. G01R 31/08
(52) U.S. Cl. .......................................... 370/216; 714/2
(58) Field of Search ................................ 714/100, 1, 2, 714/36–41, 47–48; 702/119, 123; 709/220–226, 310, 317–8; 710/8–10, 15–19; 370/216–228, 241–254

(56) References Cited

U.S. PATENT DOCUMENTS

| | | | |
|---|---|---|---|
| 5,802,146 A | * | 9/1998 | Dulman ....................... 379/120 |
| 5,838,683 A | | 11/1998 | Corley et al. ................ 370/408 |
| 6,011,579 A | * | 1/2000 | Newlin ...................... 348/14.08 |
| 6,018,567 A | * | 1/2000 | Dulman ....................... 379/120 |

* cited by examiner

Primary Examiner—David Vincent
(74) Attorney, Agent, or Firm—Marger, Johnson & McCollom, P.C.

(57) ABSTRACT

A network access server (NAS) for use in a communications system utilized by users of telephone, fax, or modem calls, the NAS having more than one processor with a plurality of processors forming a module, each processor for performing various functions by executing code stored in memory device accessible by the processor wherein either upgrading of the stored code or recovery of one or more of the processors is required. Upon determining that one or more processors are 'bad', the NAS and schedules recovery of the 'bad' processor during a window of time defined by a predetermined duration of time in the day during which the communications system is least utilized by the users, disables the particular module so that no calls are processed through the particular module and attempts recovery of the 'bad' processor during the window of time.

38 Claims, 6 Drawing Sheets

MODULE FIRMWARE RECOVERY

CROSS REFERENCE TO RELATED APPLICATION

This application is a continuation of our prior pending application, entitled "MODULE FIRMWARE RECOVERY", application Ser. No. 09/346,557, filed on Jun. 30, 1999 now U.S. Pat. No. 6,606,298, by Richard Foltak.

BACKGROUND OF THE INVENTION

1. Field of the Invention

The present invention generally related to a multi-processor system employed in communication network environments requiring maintenance and/or upgrade of the processors and particularly to systems using multiple modem Digital Signal Processing (DSP) devices, operational by execution of external and re-loadable software (or firmware) code requiring maintenance and/or upgrade thereof with minimal impact on users of such devices while maximizing utilization of the available capacity of the DSP devices.

2. Description of the Prior Art

In recent years, many hardware components are being packaged together as a unit called a module. These components can be DSPs (Digital Signal Processor), controllers, Central Processing Unit (CPU) devices, and the like. An example of a DSP device is a modem used for communication between two electronic device such as computers, embedded devices, etc. As an Example, a well-known manufacturer of network communication equipment, known as Cisco Systems, Inc., in San Jose, Calif., develops and manufactures access servers employing a particular type of modem device, MICA. In some of its access servers, such as the models 5200, 5300 and 5800, 6 or 12 MICA modems are packaged into a module. These types of access servers are used as gateways between the PSTN (Public Switching Telephone Network) and data networks, such as Internet.

A network access server (NAS) converts data traffic from the PSTN protocol (timeslot) managed data to packetized data used within data networks such as the Internet. A NAS is essentially a specialized type of router having a T1/E1 controller card. The T1/E1 controller card includes hardware for multiplexing and de-multiplexing Time Division Multiplexed (TDM) signals coupled onto T1 or E1 lines. That is, the TDM hardware separates the calls that are coupled onto a PSTN trunk, based upon assigned time slots, into individual calls. A router is a device that can select a path that information traveling through a packet switching network environment should take thereby requiring the router to have an understanding of the network and how to determine the best route for the path.

A design consequence of grouping processors (or modems) into modules, which share a mutual memory space and/or controller, is that reloading each processor cannot be accomplished on an individual basis. Instead, all processors must be loaded at the same time. This has the benefit of speeding up initial loading when no processors are active as the software will only be transferred once for multiple processors. However, this design has adverse consequences when trying to reload the processors while the system is active or operational. That is, reloading a processor that is in use terminates any end-user activity rather abruptly, causing significant frustration to the user. Reloading a processor is done for various reasons, such as upgrading the software or for maintenance purposes and the like.

Oftentimes, some hardware components, such as DSP devices, fail to function properly and will need some form of maintenance. For instance, when a modem DSP fails, i.e. hangs up at a given point in a modem call, reloading or downloading the modem's software usually resolves the problem as it returns the modem to a known state, at which point the modem is again capable of processing new calls. The need to reload a processor may also occur when the current software is out-dated and an updated version of the software needs to be downloaded. In this case, downloading is for the purpose of upgrading the software. A modem DSP is a DSP device that is configured to operate as a modem device by, for example, programming the DSP device in a manner so as to function as a modem.

However, even if a particular modem device in a module needs downloading, the rest of the modems on the same module may be active and successfully processing other incoming calls. At present, one approach to downloading is to "busy out" all the modems on a given module by making all the modems in the module unavailable to new requests by the system so that no new calls can be allocated thereto. Once there are no more active calls being processed by the given module, the module is available for having its software downloaded to all modems without impacting any end-users. While this approach offers a graceful way of reloading the modems from an end-user's perspective, it has the disadvantage of reducing the capacity of the system— network access server. For instance, to download the software for one faulty modem, 5 or 11 other properly functioning modems on the module are held inactive, sometimes for days, waiting for all end-users to end their modem connection before downloading can be achieved.

Another approach, which attempts to minimize the impact of downloading modules on the access server's capacity, is to schedule maintenance to the off-hours, at a time when fewer users may be logged onto the system. This approach basically accepts the impact of forcefully dropping any end-user calls to perform the maintenance task necessary. The disadvantage with this approach is in the possibility of taking out an entire module of active end-users to recover one malfunctioning modem. Even though the impact on the capacity is not as severe as in the previous approach discussed hereinabove, nevertheless, the end-users are disconnected forcefully from the access server, causing significant frustration to the end-users. This is especially the case if a large number of modules are to be scheduled for reloading at the same time in the off-hours, thereby affecting many access servers' end-user customers.

Modems can be deemed defective in multiple ways. Systems tests can be performed on inactive modems in order to test their integrity. Furthermore, statistical analysis can be used to identify defective modems. In this case, a modem is deemed defective if it fails to establish a connection over several consecutive calls with various end-users. This is done to ensure that the problem is originating from the modem and not from the end-user as the possibility exists that the equipment on the side of the end-user is not functioning properly and/or the end-user has simply disconnected before the call can be completed. In making several calls, the modem is likely to be connected to several users and if the calls are unsuccessful, there is a strong likelihood that the problem originates form the NAS' modem rather than the end-users. This is the preferred method for identifying defective modems as self-tests often pass even when there is a problem.

It has been the inventor's experience that modems exhibit a success rate of 90% –>95% under normal operation. That is, 90% to 95% of all calls which are allocated to a modem successfully connect, link, train up, negotiate, and finally enter a steady state such that the client (or user) and the access server modems can transfer data. The 5% to 10% failure rate can be associated to numerous issued such as incompatible equipment, clients disconnecting, etc. Thus, in at lease some prior art systems, it is expected that there at least 1 call in 10 attempts will fail.

Statistically:

The probability of 1 failed call attempt is: 1/10

The probability of 2 failed call attempt is: $1/10 \times 1/10$

The probability of 3 failed call attempt is: $1/10 \times 1/10$

The probability of n failed call attempt is: $(1/10)^n$

As such, according to basic statistics, even under a situation of where the success rate is 90%, the probability of a good modem failing to enter steady state, once allocated, drops significantly after each failed call attempt. Thus, where the value of "n" is as small as 10, one can safely assume the modem to be actually bad and mark the modem accordingly. As used in this document, "n" will denote the "modem recovery threshold <value>".

As noted previously, modem functions are implemented in a modular fashion whereby 6 or 12 modems are allocated to a single controller device overseeing the operation of the modem DSPs. An unfortunate consequence of this design is that the network access server is unable to download DSP firmware to a single modem of the module and rather requires all 6 or 12 modems to be reloaded at the same time. This issue is not significant when initializing the network access server as no active calls are being processed at that time. But, this issue is significant when trying to load a firmware code for either recovery or for upgrade purposes. A problem arises in reloading the modem module with minimal impact to the end-users and to the network access server.

As earlier noted, there are a couple of ways prior art techniques have addresses this problem. One is to "busyout" the modem module where basically all modems of the module are locked (or act as though they are busy) which will disallow new calls to be allocated on any of the modems until the "busyout" status is removed—usually after the modem module is reloaded. Existing calls on modems are not affected when the modem module is in the "busyout" state.

One way to evaluate the effectiveness of a modem module downloading technique is by observing the modem module at various times. During an hourly utilization analysis, modem usage is actually quite predictable. Telecommuters who use modems between 7:00 am and 6:00 pm provide a consistent call volume throughout the business day. The nightly "Internet surfers" "surf" the web between 6:00 pm and 2:00 am. As a result, modem usage between 2:00 am and 7:00 am is typically at its lowest.

The "busyout" technique is currently widely used for firmware upgrades. However, it has a significant drawback. A single modem end-user who decides to stay connected for days can severely impact the capacity of the network access server if the module is left in a "busyout" state until all calls drop. If there is one active call in a module of twelve modems where the remaining eleven modems are free, there can be a serious impact on a network access server's ability to perform at top capacity, especially during high load time periods. Accordingly, the need arises for a modem recovery method and apparatus for reloading firmware code with the least impact possible while maximizing successful reloading attempts.

In light of the above, it is desirable and indeed necessary to have a recovery mechanism for modem modules employed in network communications equipment which minimizes any adverse impact to the end user while maximizing the available capacity of the system. This is especially needed for systems where there is a high demand for available modems such as Internet Service Providers (ISP) providing access to the Internet. For such systems, it is important to have as many modems available as possible at any given time especially during the peak hours when many users place calls.

Furthermore, currently, maintenance of a system that includes modem devices, such as an access server and the like, is performed manually. For example, if the system needs to be upgraded, the operators have to come in during off-hours, such as 3:00 AM, to perform their maintenance tasks. It is therefore desirable to automate the process of maintenance so that various equipment modules can be self-sustainable. That is, when a problem develops within a module there is an algorithm which detects the problem, designates the module for maintenance, performs the required maintenance and places the module back into operation with as little impact as possible to end-users activity and overall system capacity.

Therefore, the need arises for minimizing end-users impact while, at the same time, maximizing the available capacity for processing requests through systems that contain modular reloadable processors such as modem DSPs and to do so automatically.

SUMMARY OF THE INVENTION

Briefly, a method and apparatus of the present invention includes a network access server (NAS) for use in a communications system utilized by users of telephone, fax, or modem calls, the NAS having more than one processor with a plurality of processors forming a module, each processor for performing various functions by executing code stored in a memory device accessible by the processor wherein either upgrading of the stored code or recovery of one or more of the processors is required. The NAS determines that one or more of the processors of a particular module is 'bad', marks the bad processors as being in a 'Recovery Pending' state, schedules recovery of the 'bad' processor during a window of time defined by a predetermined duration of time in the day during which the communications system is least utilized by the users, disables the particular module so that no calls are processed through the particular module, attempts recovery of the 'bad' processor during the window of time and if the step of attempting recovery takes longer than the window of time, stops the recovery and retries recovery during the window of time on the next day or forces reloading to occur at that time by clearing any users that may be holding up downloading.

The foregoing and other objects, features and advantages of the invention will be apparent from the following detailed description of the preferred embodiments which made reference to the several figures of the drawing.

IN THE DRAWINGS

DETAILED DESCRIPTION OF THE PREFERRED EMBODIMENTS

Figure 1:
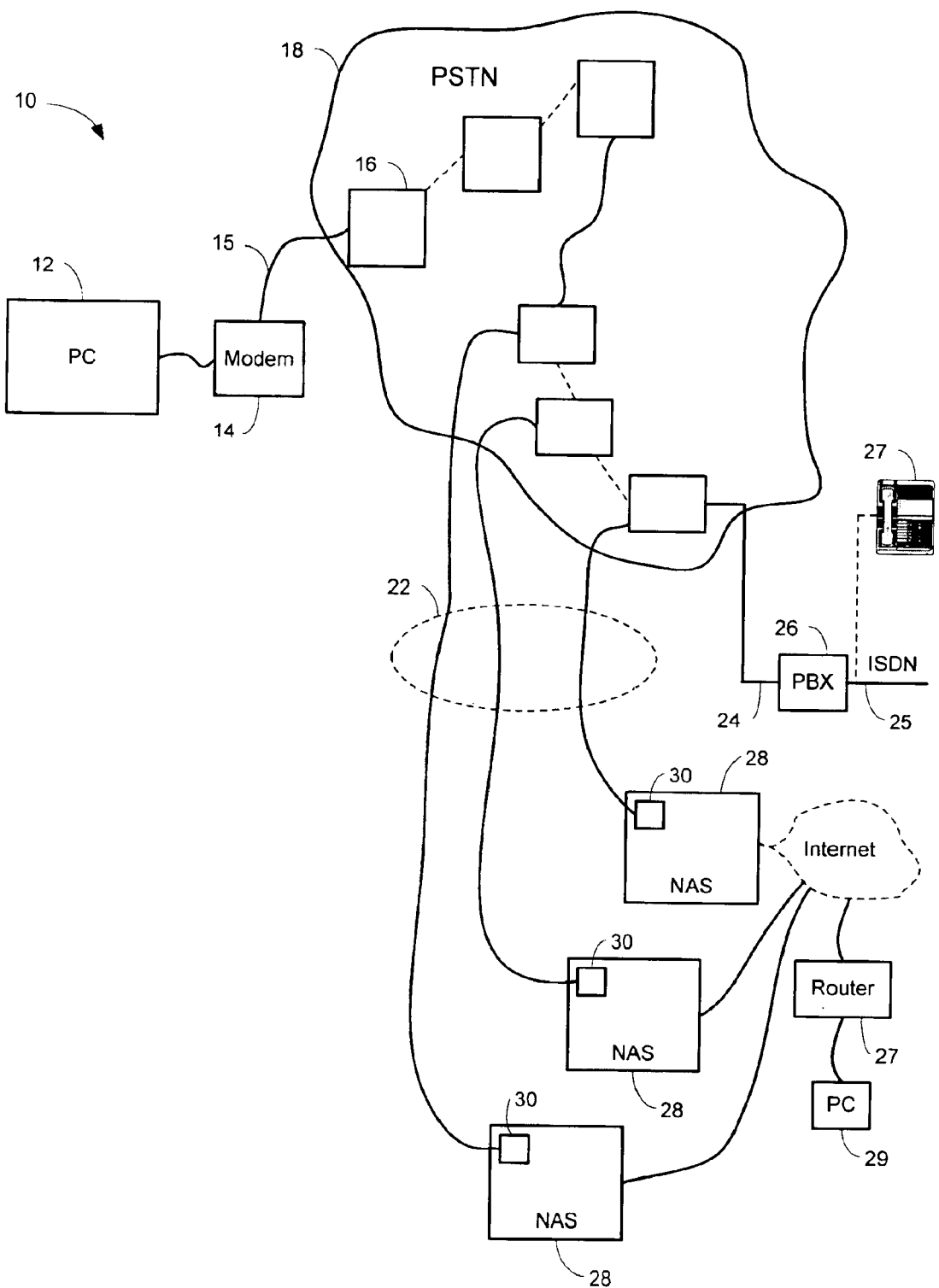
FIG. 1 shows a communication network including a NAS in accordance with an embodiment of the present invention.

Referring now to FIG. 1, an embodiment of the present invention is shown to include a communication network system 10 for establishing communications between a point of origin and a destination point. The point of origin and destination point may be two communications equipment, such as fax machines, modems, Personal Computers (PC) and the like. In FIG. 1, an example of a destination point is shown to be a telephone 27 with another example being a PC 29. A point of origin, in FIG. 1, is shown to be an end-user 12, an example of which is a PC.

In FIG. 1, the communication network 10 is shown to include an end-user 12, a modem device 14, coupled through a PSTN (Public Switched Telephone Network) 18, a Private Branch Exchange (PBX) 26 and three Network Access Servers (NAS) 28.

The PSTN 18 includes devices such as 'switches' that form a part of the public telephone network. While a switch is not shown in FIG. 1, a line card 16, as well as other line cards, are shown in the PSTN 18. The line cards generally perform switching operations in the PSTN. The communication line 15 couples information, such as data, which is in analog form between the modem device 14 and the line card 16. In FIG. 1, the line card 16 acts as the primary interface into the PSTN from any devices connected to the communication line 15 at the end-user's location (fax, phone, modem). The line card 16 is responsible for sampling the analog information being transmitted on communication line 15 and converting it into digital format. From this point on, all data is transmitted within the PSTN in digital form. The PSTN is also responsible for multiplexing multiple communication lines 15 into a single digital trunk which, using time slicing—allocating a timeslot within the trunk to a single call—can compress multiple calls into a single T1 or E1 trunk. Certain countries, such as the US, utilize T1 trunk lines, whereas, others, such as European countries, utilize E1 trunk lines. These T1 or E1 trunk lines are then managed within the PSTN via carrier switches. For the purpose of discussion, the PSTN 18 includes all devices within the network that are managed by a single carrier switch.

Line cards shown within the PSTN 18, including the line card 16, are essentially carrier switches used by the telephone company for switching various incoming calls to different destinations. Generally, information within the PSTN travels from one PSTN to another before it reaches a final destination. The diagram in FIG. 1 is primarily shown to demonstrate that when a modem, such as the modem 14 initiates a call, a processor (not shown in FIG. 1) within one of the NAS 28 assigns or allocates a particular Digital Signal Processor (DSP) device (not shown in FIG. 1) for processing the call. Each DSP device generally includes memory for storing firmware or software code that is executed by the DSP.

It should be noted that in one embodiment of the present invention, a method and apparatus, as shown in FIG. 1 and following figures, is used to recover and/or upgrade the software (or firmware) code employed by the DSPs within each NAS without substantially degrading the performance of the system. That is, during the time when many calls are placed by modems, recovery and/or upgrade of the DSPs that need such recovery and/or upgrade is performed in accordance with the present invention without disrupting calls that are being placed and processed by other DSPs. Recovery of DSPs is generally performed when a DSP is detected as being 'bad' or inoperational. This condition oftentimes occurs when software that is executed by the DSP becomes stuck in an infinite loop, stuck in an unknown or inoperable state, or contains other 'bugs', or when the memory in which the DSP software is stored is faulty. These conditions are corrected by simply re-downloading the software code to the DSP memory, which happens during recovery. During upgrade, the DSP software is being replaced by a different code, such as a new and improved version.

Referring still to FIG. 1, the end-user 12, which may be Personal Computer (PC) or other types of communication equipment, is coupled to the modem device 14 and alternatively may include the modem device 14. The modem device 14 is coupled to the line card 16 through a communication line 15.

The modem device 14 receives data from the PC 12 and converts the same into analog format for transmission thereof through the communication line 15. The line card 16 receives the analog data, coupled through the communication line 15, and converts the same to digital format. In digital format, numerous calls can be multiplexed into a single physical communications link, thus, transmitting multiple calls at the same time over one physical cable. Hence, there is great advantage in transmitting data in digital format.

Alternatively, the modem device 14 may be a telephone transmitting voice information. In such a case, the line card 16 converts the voice information to a digital signal at a rate of approximately 53 Kbits/sec. In this manner, up to 24 phone calls can be transmitted at the same time through the PSTN 18.

In FIG. 1, the PSTN 18 is shown interlinked to the PSTN 20. There are various trunk lines, which extend from the PSTN 20. In one embodiment of the present invention, these trunk lines are, collectively, Primary Rate Interface (PRI) lines 22, defined as a part of a T1 protocol adopted by the industry at-large for communication between devices employed in the Integrated Services Digital Network (ISDN) environment. Alternatively, these trunk lines may be any other type of commonly employed communications lines. Another communication line 24 is shown to couple the PSTN 20 to the PBX 26. The communication line 24 may also be PRI or any other type of commonly-employed communication line. The reason the communication line 24 is labeled separately is because it is used to couple the PSTN 20 to the PBX 26, while lines 22 are used to couple the PSTN 20 to the three NAS 28.

Each of the communication lines 22 and the line 24 couples twenty four separate communications channels (timeslots) for PRI data. That is, each of these lines is a trunk carrying up to twenty four separate physical lines (generally copper wire) for coupling phone calls and/or data calls generated by modems. Accordingly, in an embodiment using PRI as the communication lines 22 and 24, each of the PRI lines would carry 24 communications channels. Each NAS 28 transmits data to various destinations (not shown in FIG. 1) such as the Internet. Each NAS 28 includes one or more DSP devices for assisting in the transmission, reception and processing of the data through the NAS 28. An example of an NAS is the AS5800 model of products developed and manufactured by Cisco Systems, Inc. of San Jose, Calif.

Within each of the NAS 28, there is further at least one modem device 30 that may be in the form of a DSP device.

As earlier discussed, when a call is initiated by the modem 14, the processor 34 (not shown in FIG. 1) within one of the NAS 30 allocates one of its modem devices, such as the modem device 30 to the call for receiving and processing of the same. The communication lines, PRI 22, couple digital information between the modem device 14 and the modem devices 30 of the NAS 28.

A connection, such as a phone call, is successfully made if the modem device 14 can effectively communicate with one of the modem devices 30 through the PRI 22. The modem device 14 communicates with modem device(s) 30 by first negotiating with the latter regarding various aspects of data communication protocols, such as the frequency of data transfer and whether any compression can be performed on the data being transferred. Compression of data requires encoding the same into an efficient format for transmission.

Negotiation between modems is performed because users do not always have the same version of software in their modems and different versions differ in various aspects of data communication such as speed, frequency, etc. Once the modems have established common parameters for communication therebetween, they begin transmitting data and basically act like two communications terminals. Accordingly, once modems, such as the modem devices 14 and 30 establish communication between each other, they are said to be in "steady state" mode.

In FIG. 1, each of the NAS 28 is shown coupled to a router 27 through the Internet and the router 27 is shown ultimately coupled to a PC having an Ethernet Local Area Network (LAN) capability. The router 27 is coupled to the PC 29 through an ethernet connection. Similarly, each of the NAS 28 includes a router, accessed via the Ethernet. The latter router acts as a gateway to the Internet.

Figure 2:
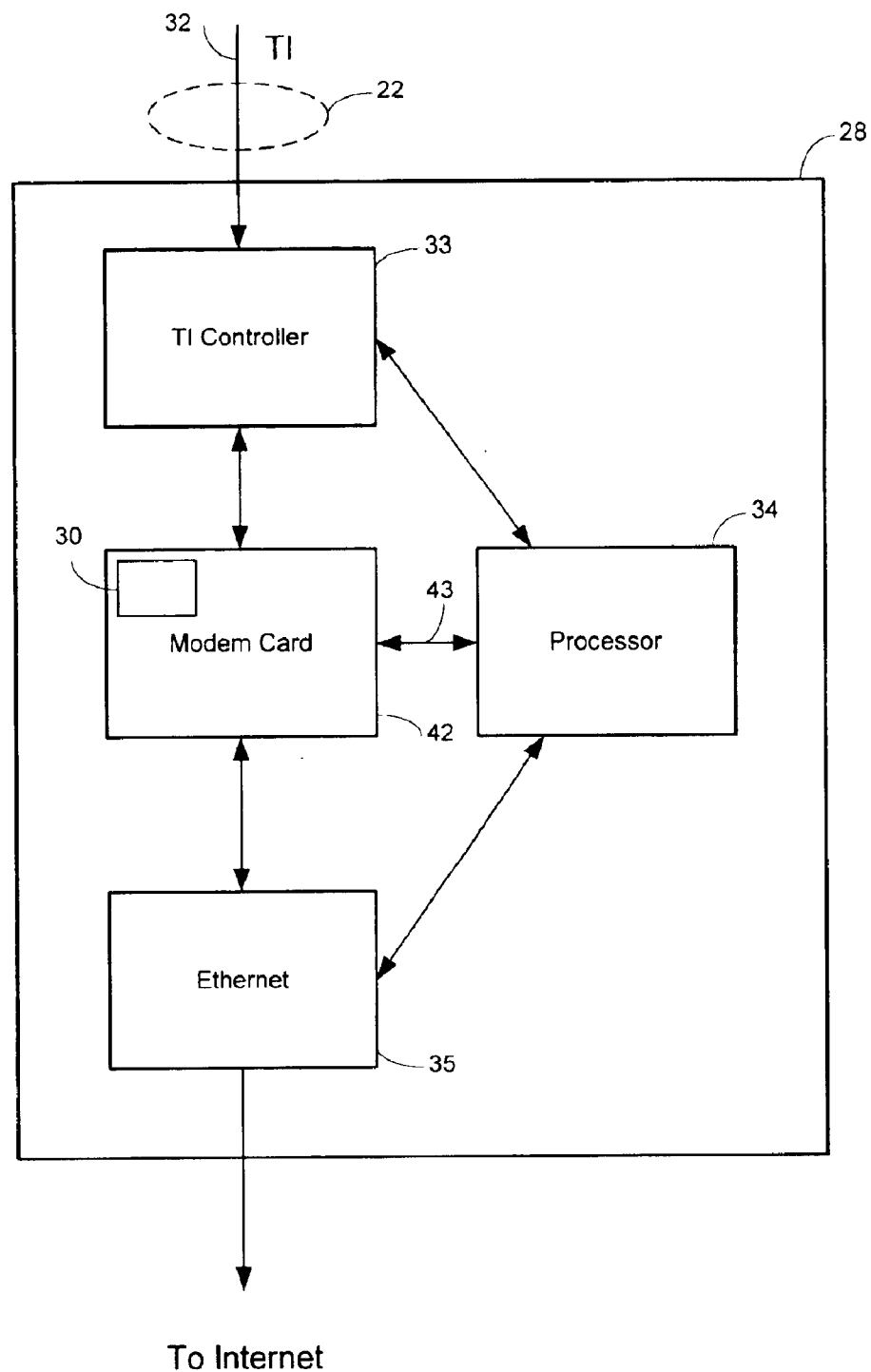
FIG. 2 shows a high level block diagram of the NAS of FIG. 1 in accordance with an embodiment of the present invention.

In FIG. 2, further details of the NAS 28 are shown to include a T1 PRI line 32, which is one of the trunks included in the lines 22 carrying 24 communications channels, a T1 controller 33 configured for PRI protocol communication, a processor 34, an ethernet card 35 and a modem cards device 42. The T1 controller 33 obtains signaling information from the PSTN 20 (shown in FIG. 1) that a new call is requested on a given T1 timeslot. The controller 33 notifies the processor 34 of this request, at which point the processor 34 finds a free modem within the modem card 42 and attempts to couple the T1 timeslot provided for the call to the free modem.

The T1 controller 33 is coupled to the modem cards device 42 and the processor 34. The modem cards device 42 is coupled to the processor 34 and the ethernet connectors 35 and the latter is coupled to the Internet.

While not shown in FIG. 2, the modem cards device 42 includes a number of modem cards. Each modem card includes a number of modules with each module having a module controller device and various modem devices (an example of the latter is shown in FIG. 1 as the modem 30). The modem devices may be DSP devices.

Once the T1 timeslot is coupled onto the free modem (the free modem is actually no longer 'free' since it is now processing the T1 timeslot couple thereto), the latter negotiates with the end-user modem on how the two modem devices will communicate. As soon as this is completed, the end-user device (an example of which is shown in FIG. 1 as the PC 12) and the NAS's processor 34 begin to negotiate higher level functions such as authentication, routing, IP addresses, etc. This is necessary so that the end-user device can be added as an extension to the data network being managed by the NAS. Upon completion of negotiations between the two modems, modem information can be routed by having the free modem transmit information, managed via the processor 34, to the ethernet card 35. The processor 34 assigns the T1 timeslot to the free modem.

The processor 34 may be any kind of CPU processing device capable of communicating and managing a variety of devices through a shared bus. Examples of such CPU devices are the PowerPC made by Motorola, Pentium made by Intel, etc. The processor 34 along with the ethernet card 35 constitute what is typically referred to as a router.

The processor 34 manages the operation of NAS 28 by allocating calls to various modems on the modem cards by establishing the communication channel between the timeslot on the T1 controller and the modem 30 on the modem cards device 42. That is, when a call is initiated by the modem 14 (in FIG. 1), the processor 34 determines which modem of the various modules on the modem cards devices 42 is free so that the next call can be allocated thereto. The processor 34 maintains a significant amount of information with respect to all the devices it manages for both statistical and management purposes. Furthermore, the processor maintains full control over each of the devices so that it may enable or disable any device it deems necessary. As such, the processor 34 can disable an entire modem card, or a specific modem if it so chooses.

The modem cards devices 42 include numerous modem cards and each modem card includes various modem modules. Each modem module comprises a module controller, a number of DSP devices and a memory block. In one embodiment of the present invention there are either 6 or 12 DSP devices on a modem module. Alternatively, any number of DSP devices may be included in a module. Examples of DSP devices are the TMS320xx family of products manufactured by Texas Instruments, Inc. Each NAS may include many modems (or DSP devices). As an example, a modem cards device may include 120 modems which allow it to assign 120 modem calls by the processor at any given time. The problem with prior art systems is when a number of these modems need upgrading or recovery, the modem modules within the modem cards must be taken down or become inoperational while the modems are upgraded and/ or recovered. This obviously leads to system performance degradation and at minimum, customer dissatisfaction. As will be shortly clear, the present invention upgrades and/or recovers the modems in such a way as to minimize customer dissatisfaction while at the same time minimizing the inoperational timeframe for modems being upgraded and/or recovered.

When there is a need for either recovery or upgrading of a DSP, the processor 34 initiates downloading of a data file containing the most up-to-date version of DSP software to the modem cards device 42 through a shared backplane bus (not shown in FIG. 2). The shared backplane bus provides a connection and protocol for coupling the processor 34 to the modem cards device 42. The software to be downloaded is stored in and accessible via a file system coupled to the processor 34 (not shown in FIG. 2). Upon a command from the processor 34, the software is downloaded via a bus 43 to the modem cards device 42 onto one of the modem modules of the modem cards device 42 and specifically onto the module controller of the latter modem module, which is responsible for updating all the modems under its control. The present invention embodies an automated method for recovering and upgrading the modems of the modem cards device 42 in the form of an algorithm which is implemented on the NAS 28 and details of which are expounded in subsequent figures.

Figure 3:
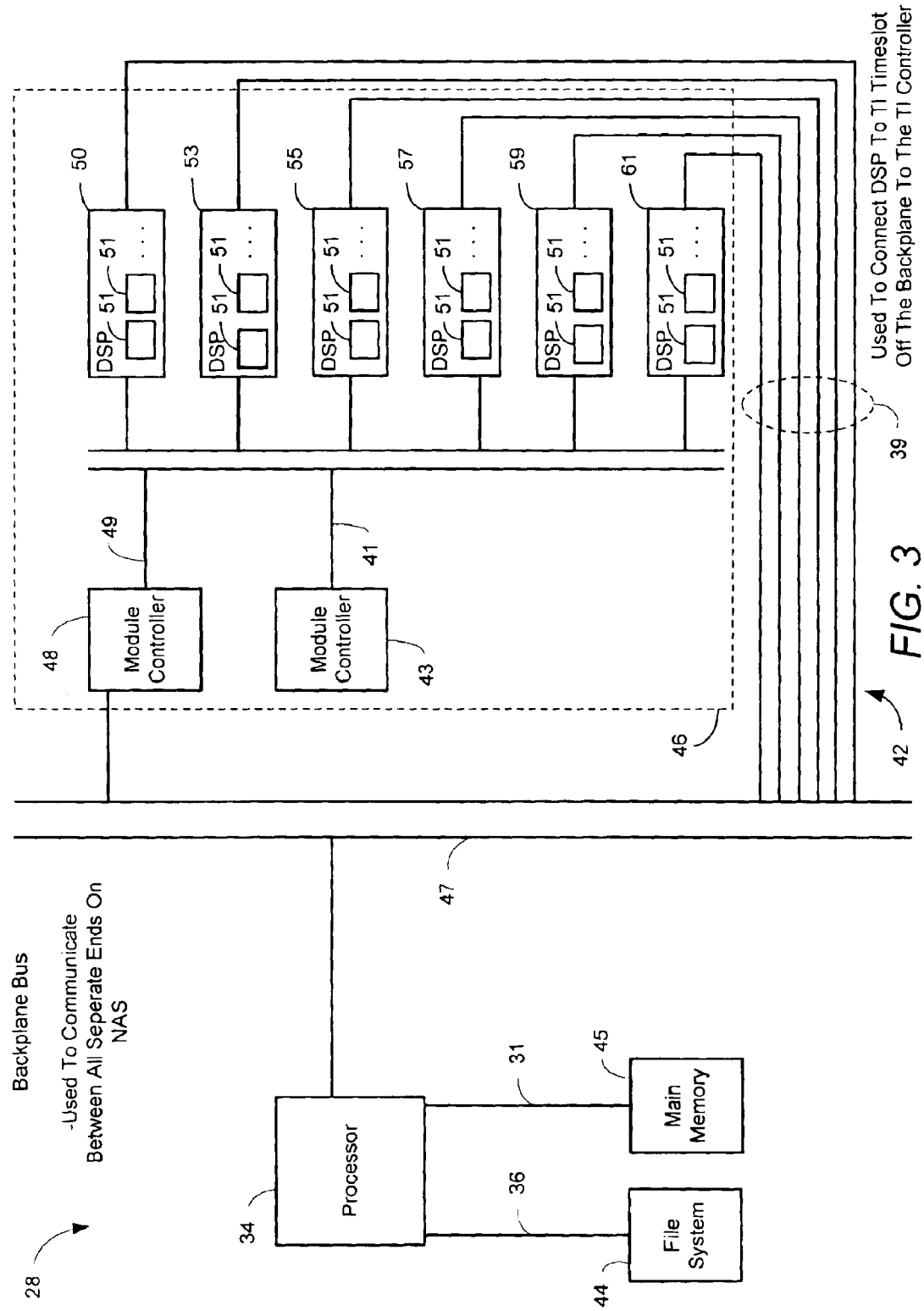
FIG. 3 illustrates further details of the NAS of FIG. 1.

FIG. 3 shows even further details of the NAS 28. In FIG. 3, the processor 34 is shown coupled to a modem module 46 (located within the modem cards device 42) through a shared backplane bus 47. The backplane bus 47 is used for communicating between all NAS. The processor 34 is coupled to a main memory unit 45 via a bus 31 and it is also coupled to a file system 44 via a bus 36. The processor 34 stores both program code (the software for the NAS) and data (data used to execute the software) in the main memory unit 45. Furthermore, typically, the processor 34 utilizes the file system 44, which could be either a hard drive, or nonvolatile memory such as NVRAM, for storing modem software. Alternatively, the file system 44 may be stored in a storage space located externally to the NAS.

The modem module 46 resides in one of the NAS's modem cards 42 and in FIG. 3 is shown to include a module controller 48 and six DSP devices, 50, 53, 55, 57, 59 and 61. While module 46 is shown to include six DSP devices, in alternative embodiments, other number of DSP devices may be readily employed per module. As earlier noted, the DSP devices may be modem devices, such as the modem 30 shown in FIG. 1. Module controller 48 is shown connected to the DSP devices 50, 53, 55, 57, 59 and 61 via a communications bus 49.

Within each modem module 46, there are one or more memory blocks, such as a memory block 43, used to store the software (or firmware) code that is downloaded to the DSP devices by the processor 34 and that is executed during operation of the DSP device. Different configurations are possible. Either one memory block is shared between all DSP devices 50, 53, 55, 57, 59, 61 or each DSP has its own memory block. For the purpose of discussion, a single memory block, i.e. memory block 43, is used in the embodiment of FIG. 3 and it is shown connected to the DSP devices via a bus 41.

As earlier discussed, a NAS is likely to contain a large number of modem. Some of the higher model NAS devices, such as Cisco's 5800 product, can have up to 2,048 modems. The next generation of NAS devices are being developed with significantly higher numbers. Given time, some of the modems (or DSP) devices are bound to fail in the course of operation of the NAS. For example, in FIG. 3, during operation of the NAS 28, while the DSP devices 50, 53, 55, 57 and 59 are functional, the DSP device 61 may fail to establish connection for some reason. If the modem device which originated the call, such as the modem device 14 (in FIG. 1), does not finish negotiating the communication protocol with one of the DSP devices on the module 46, the call is considered to be a failed connection. A modem or DSP device is considered 'bad' if it fails to function for a number of consecutive calls, such as twenty or thirty consecutive calls. A threshold is set dictating the number of consecutive calls that are allowed to fail before a modem is declared 'bad', as will be shortly discussed in more detail. The reason for waiting for a number of consecutive failures prior to declaring a modem to be 'bad' is because after twenty or thirty consecutive failed attempts to establish connection from different callers, it is reasonable to assume that the problem lies within the receiving modem, and not the end-user client's modem. In this respect, occurrences of false alarms or failures relating to the originating modem rather than the receiving modem are eliminated.

Once a modem or DSP device is determined to be 'bad', the failed modem, in the example of FIG. 3 this is the DSP device 61 in this example, is labeled or flagged as 'recovery pending' and designated for recovery by the processor 34. Accordingly, the processor 34 will not allocate any new calls to that modem until it is recovered through downloading.

Recovery is performed by an algorithm initiated by the processor 34. Recovery can take place in either one of two way: as soon as it is safe or during hours when the demand on the system is at its lowest such as 3:00 AM where maintenance can be performed with minimal impact. The time for setting the recovery maintenance operation to begin is configurable and is preferably selected to suit the needs of the customer.

It is safe to perform recovery during a time when no active calls are found within a given modem module. As such, if no active calls are allocated, even at a typically busy time such as 2:00 p.m. on a Monday, then downloading should proceed immediately as no customers will be impacted and the modems will be upgraded and/or recovered immediately. This results in upgrading and recovery of the modems as soon as possible with the least impact to both capacity and end-users. Since the operation of downloading takes a few seconds to complete, the capacity impact on the NAS is negligible (as modems are not available for new calls during the download itself). Furthermore, end-user impact is non-existent.

Oftentimes, we cannot rely on the "as soon as it is safe" approach to perform upgrade and/or recovery. This is because we are in a situation where the NAS is used in a network similar to that in FIG. 1, where the T1 lines coming from the PSTN all map to the same phone number. Depending on the carrier switch involved, calls could be assigned timeslots on a first available basis and not in a round robin basis. This results in all calls being assigned to one NAS first, and only when this NAS is at 100% capacity, the remaining calls will be allocated to the next NAS, and so on. Once a call is allocated to a NAS, it will remain there for the duration of the call's lifetime. As such, it is obvious that a solution is needed to ensure that even those NASes which are used at very high frequency also have their modems upgraded and/or recovered in a minimally-impacting manner. This is where recovery maintenance is necessary.

Figure 4A:
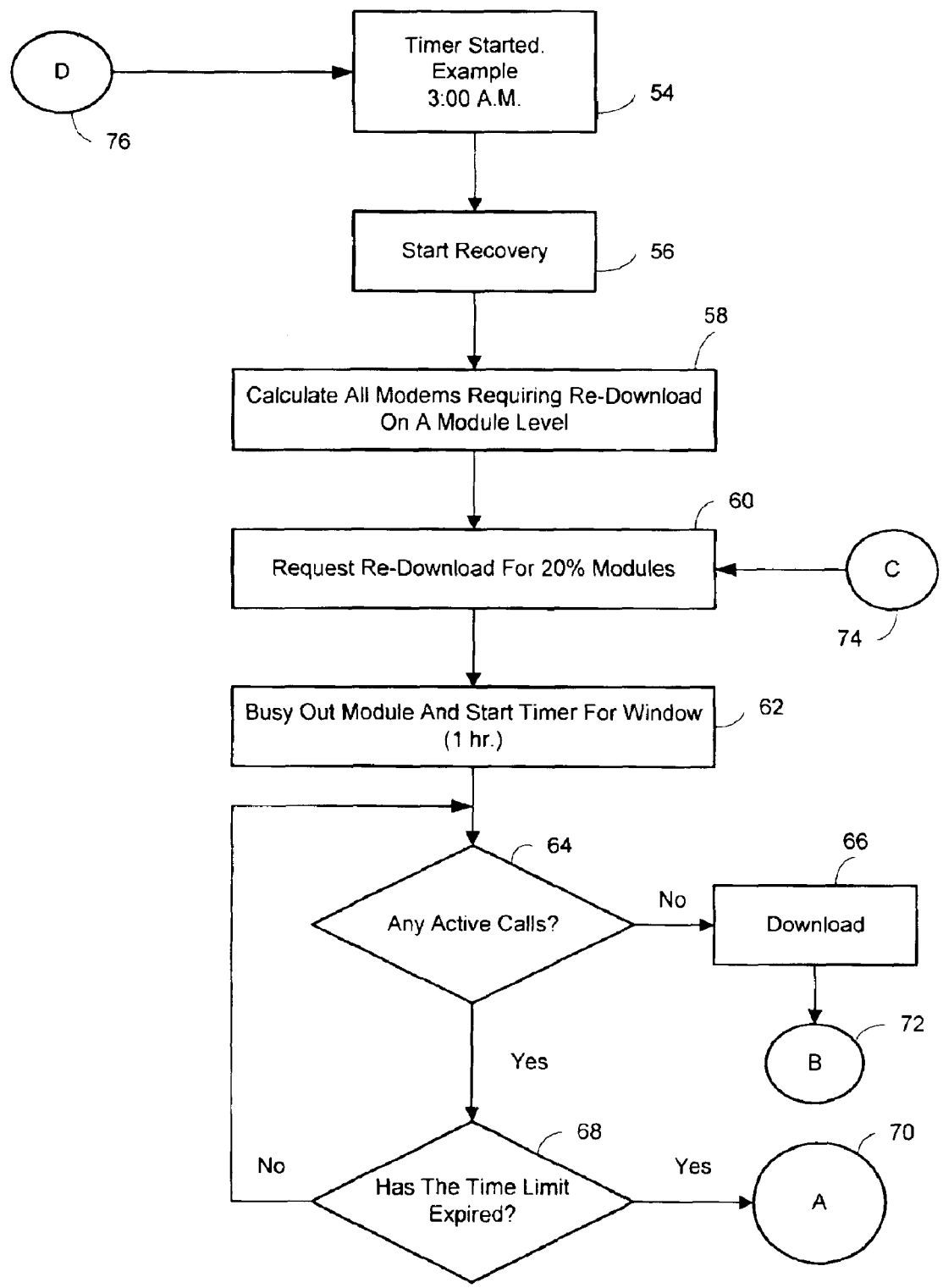
FIGS. 4a and 4b show a flow chart of the recovery and/or upgrade operations in accordance with an embodiment of the present invention.
Figure 4B:
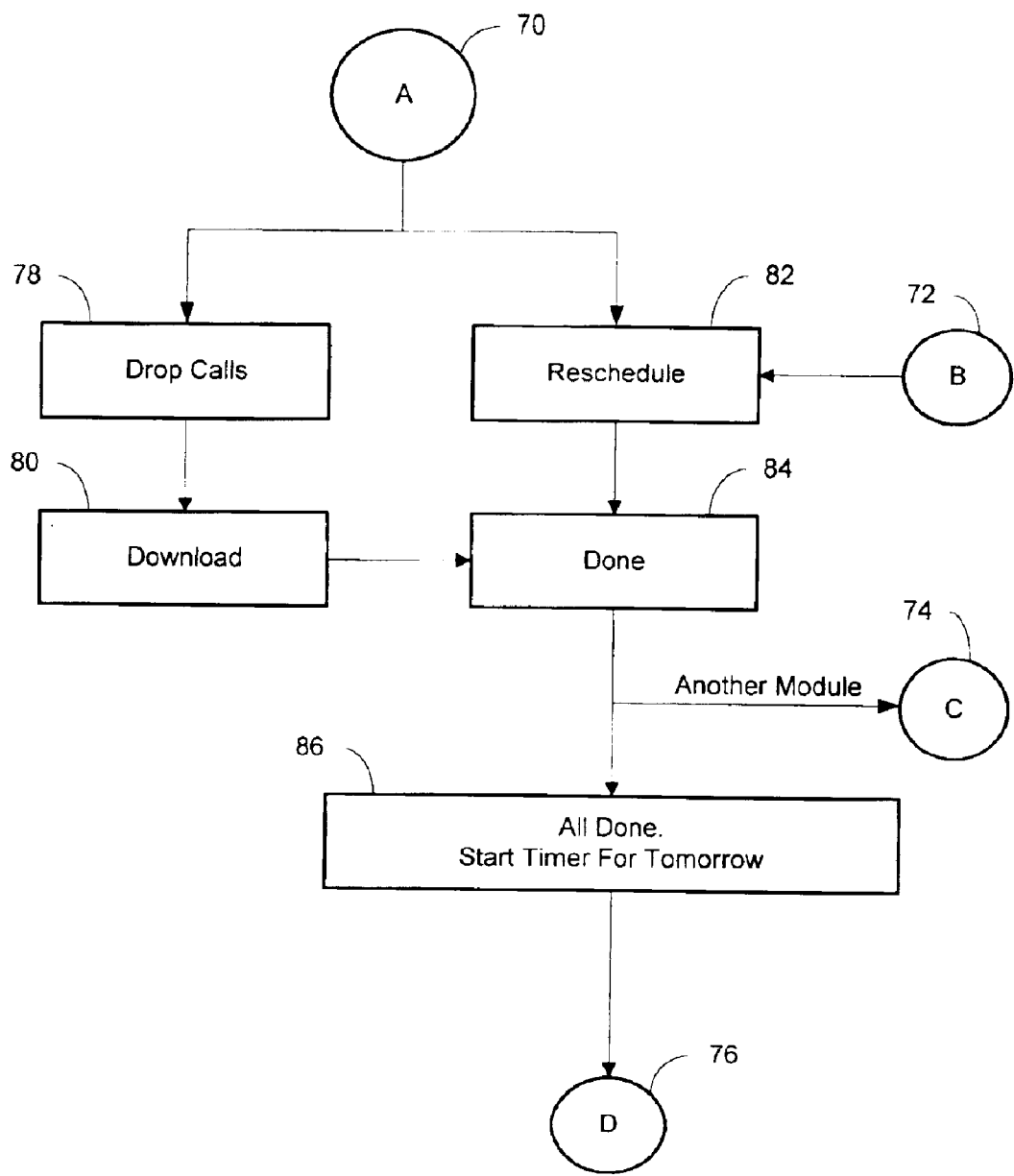

FIGS. 4a and 4b show a flow chart of the recovery maintenance algorithm in accordance with an embodiment of the present invention. The processor 34 (shown in FIG. 3) sets a programmable timer to 3:00 AM at step 54. As earlier noted, this time is programmable and can be selected, by the customer, to be any time that the customer deems appropriate for conducting a recovery or upgrade operation. At this time, assuming there is still a need for recovering or upgrading modems, the process of recovering 'bad' modems or modems needing upgrade begins as indicated at step 56. Next, the total number of modules to be recovered or upgraded is determined be the processor 34 as shown in step 58. This is done on a module level, i.e., by determining the number of modules having modems that need to be recovered or upgraded.

It should be noted that there is no attempt to recover all of the modules at the same time since this may reduce the available capacity of the system even at hours when the demand on the system capacity is not at its peak. Instead, a subset of the modules are designated for recovery at any given time so that the remaining modules are free to answer the incoming calls coupled onto the T1 line 32 (shown in FIG. 2). As an example, twenty percent of the modules may be designated for recovery at one time. In this manner, sufficient capacity for handling calls is made available throughout the day and night and even when recovery is taking place. If less modems are made available as a result of this recovery maintenance activity there are T1 timeslots available for incoming calls, a separate mechanism will busy-out an appropriate number of timeslots to ensure that no new modem calls are requested to this NAS if there is an insufficient number of modems to accept the calls.

Recovery is performed by downloading the software to the DSP devices, i.e. 50, 53, 55, 57, 59 and 61, through the module controller 48. This is indicated at step 60 in FIG. 4a. Processor 34 'busies' out the module to be recovered for a configurably-predetermined time window of one hour at step 62. 'Busing' out has the effect of placing all of the modem or DSP devices of the module that is being recovered in 'download pending' state so that no new calls are allocated to the module until the download completes. This is done by setting a flag pertaining to the module being recovered.

For the duration of the predetermined time window, no new calls are allowed to be allocated to the module being recovered and only the active calls that were received prior to the start of the time window continue to be processed. The duration of the time window, here taken to be one hour, is configurable and can be adjusted as it best suites the customer requirements. The purpose of this time window is to allow normal termination of any active calls found on the module to take place while at the same time stopping any new calls from being allocated to the module. The ideal situation for this invention is to ensure that modules are downloaded when no active calls are found. If new calls continue to be allocated, this could not be achieved.

As soon as there are no active calls, the DSP software, which as previously noted, that is stored in the File System (shown in FIG. 3) is downloaded to the specific module which no longer has active calls, through the back-plane bus 47 (shown in FIG. 3) to the module controller 48, at step 66. Downloading of software is considered a fairly fast process taking, for example, approximately ten seconds to complete. Once downloading is completed, recovery for this particular module is considered completed and the process continues to step 84, shown in FIG. 4B. All modems within that module are released from being 'busied-out' and are capable of accepting new calls again.

However, since multiple modules are attempted to be recovered during this maintenance window, each module is reloaded individually depending upon call utilization. This process continues to monitor call activity on the modules 'busied-out' for the duration of the maintenance window.

In the embodiment where twenty percent of the modules are designated for recovery at any given time, it takes approximately five hours to go through the entire set of modules. After recovery is performed for the entire set of modules, at step 86 (in FIG. 4b), a timer is started to wait for the next day for performing recovery again, if needed. The next day if recovery is required, the steps to be executed start with step 76 and recovery begins at the same time as the last day's recovery, which in this example is at 3 AM.

It is preferable to perform recovery every night considering that there are generally a large volume of modem or DSP devices in a NAS, such as more than 2000 modems on high end platforms, and, on the average, few of these modem devices may need recovery every night. In this manner, performing recovery every night maintains the number of modems that are not functional to a minimum thereby providing users with near maximum capacity of the system.

Referring back to FIG. 4a, if there are any active calls, as determined at 64, a determination is made as to whether or not the window of time for recovery (one hour in this case) has expired at 68. If it has not, the processor 34 once again checks for any active calls for each module "busied-out". If no active calls are detected, the software code is downloaded at step 66 to the module in question. If the time limit has not yet expired and there are active calls remaining, these determinations continue to be made at 64 and 68. If the time limit has expired which in this case is one hour, but in general is a configurable feature of the system, there are two alternatives that can be pursued. The first one of which is shown at step 82 in FIG. 4b where the active calls are allowed to continue without disruption and recovery is rescheduled for some other time such as at the same time but on the next day, after which the process of recovery is completed for this set of modules at step 84. This is essentially a "give-up" alternative, it is often times preferable to have a few modem kept out of service than to affect end users. When recovery tries again the following day, a new set of callers will most likely be involved: thus, increasing the likelihood that the download will succeed on the following day. Moreover, the module to be recovered may have already been reloaded as soon as it is safe to do so.

Alternatively, after the expiration of the time limit at step 68, the active calls may be forcefully disconnected or dropped as indicated at step 78. Thereafter, downloading can begin immediately, as shown at step 80. Dropping or disconnecting calls is clearly unpleasant to the end-users who are being disconnected from the system. However, this inconvenience is alleviated to some extent because the end-users have likely already been connected to the system for more than an hour and if they redial they can log onto the system again due to the availability of other functional modem or DSP devices to handle their calls. As such, this option is available and configurable to the NAS operators. One advantage of this method is that it guarantees that all modems needing upgrade or recovery will be reloaded within the recovery maintenance period while still minimizing overall impact. Once downloading is completed at 80, the process of recovery for this set of modules comes to an end at step 84 and another set of modules is considered for recovery at 74 and step 60 proceeds.

There are two ways in which 'bad' modems may be detected. Once is a system initiated test which determines if the modem is functioning properly. This test is performed by selecting the modems within the system to attempt to negotiate a communication connection with one another. In the event that any modem fails to negotiate such a connection, it is flagged as being 'bad'. This test, however, may not detect all of the defects inherent to the modem or DSP device. For instance, if there is bad release of the software installed on the modem or DSP devices' memory, 51 (in FIG. 3), the modem devices may nevertheless be able to communicate with each other while they may not be able to do so with any end-user client modems.

The second method of testing is statistical in nature. In this case, the modems are communicating with end-user client modems from a variety of manufacturers. If the same NAS modem fails to connect to a number of different end-user client modems on a consecutive basis, then the probability that the problem lies with the NAS modem is much higher than that of the end-user client modem. As such, modems which fail to negotiate a communication protocol a numerous consecutive amount of time is flagged for recovery. This is the preferred way of detecting bad modems.

In the present invention, downloading of firmware takes place as soon as it is possible without requiring a "busyout" of the modems of a module. That is, if any modem on a given module is in either a "Recovery Pending" or "Upgrade Pending" state and if there are no active calls remaining on that module, the module is downloaded to right way.

"Busyout"s will be scheduled to the off-hours where modem recovery maintenance will be performed on the modules. This is especially effective with respect to NAS devices which are heavily loaded with calls throughout the day. Thus, no new calls are allocated to a modem module while its active calls have a chance to drop normally before proceeding with the download.

However, unlike the regular "busyout", the modem recovery mechanism only "busyouts" the module for a predetermined window of time. Basically, there is a "give-up" point in the "busyout".

If the window of time for downloading expires, the module undergoing downloading cannot continue being frozen and the module is returned to normal operation with faulty modems of the module remaining inoperational. Even thought "busyout" occurs in the off-hours, in one embodiment of the present invention, "busyout" is not performed on more than 20% of a NAS's modem modules at any given time.

The "busyout" behavior is managed via the modem recovery maintenance configuration, which includes the time (when recovery starts in the off hours—3:00 am default), the window ("busyout" maximum duration for a single module to finish its download), and max-download (the maximum number of modem modules which can be "busyout"ed at the same time during the window-default is 20% of NAS capacity—dynamically calculated).

For the purpose of discussion, consider the case where the following settings on a NAS having 10 modem modules (all requiring reloading) and the following configuration:
modem recovery maintenance time 0:00 (hh:mm)
modem recovery maintenance window 60 (minutes)
modem recovery maintenance max-download 2 (value)

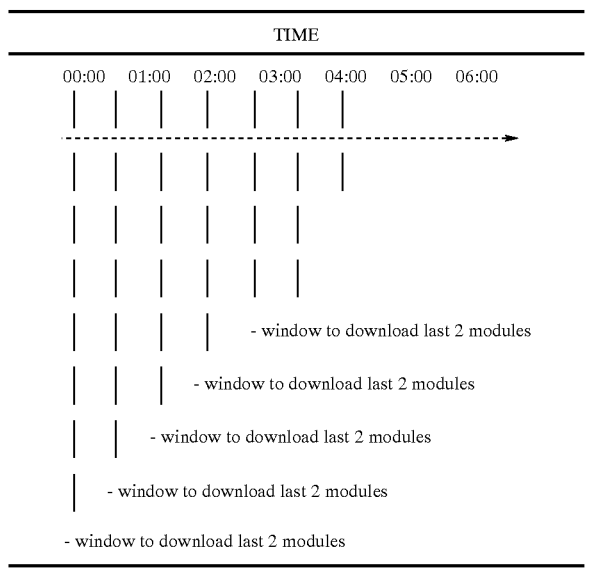

In the above case, the NAS will be in a recovery maintenance "busyout" state for at most 5 hours.
The following are programmable parameters set by the user relating to modem recovery and upgrade:
Modem Recovery Threshold <Value>
    Number of consecutive call attempts which fail to train up before the modem is deemed faulty. The default is set to 30.
Modem Recovery Action <Action>
    Once a modem has been deemed faulty, the configured action will take place on the modem. The following choices are possible:
        disable: Mark the modem bad
        none: Ignore the recovery threshold and just keep going.
        download: Set the modem into a recovery pending state thus stopping the modem from accepting new calls.
Modem Recovery Maintenance
    Every 24 hours, the modem recovery maintenance process will wake up and attempt to recover any modems which are in the pending recovery state.
Modem Recovery Maintenance Time <hh:mm>
    Actual time of day when the modem recovery maintenance process wakes up and starts recovering the modems. This is defaulted to 3:00 am.
Modem Recovery Maintenance Window <Value>
    When a module attempts to reload it's firmware, it is preferable that the module take down any modem connections which may exist. As such, the recovery process sets all modems currently not in use to 'Recovery Pending' state. If any modems on the module are active, the recovery process waits for the calls to terminate normally.
    In order to avoid capacity problems due to attempting recovery for an excessively long time period, a maintenance window is configured for requiring the modem recovery to take place within the time frame defined by the window. Alternatively, a predetermined action will be performed on that module when the window expires. In one embodiment of the present invention, the default window is set to 60 minutes.
Modem Recovery Maintenance Action <Action>
    When the modem recovery maintenance window expires, one of the following actions will be performed on the modem module awaiting recovery:
        disable: Mark the originally faulty modem as being bad and return all other modems back into service.
        reschedule: Leave the originally faulty modem as needing recovery and return all other modems back into service. Recovery will be attempted again on the following day.
        drop-call: Force recovery by dropping any active calls remaining on modems within the module.
    In one embodiment of the present invention, the default is set to 'reschedule'.
Modem Recovery Maintenance Max-Download <Value>
    When the modem recovery maintenance process starts, attempts are made to recovery all modems that are in the 'Recovery Pending' state. This may include all modules. Thus, to avoid inactivating all modems, only a maximum number of modules may be simultaneously recovered. In one embodiment of the present invention, this maximum number is dynamically calculated to be 20% of the modules.
Modem Recovery Maintenance Schedule <Action>
    This parameter is used to determine if module recovery is to be attempted as soon as a problem is found or to wait for the maintenance window, as discussed above. These two conditions are as follows:
        immediate: Don't bother waiting and attempt to recover module right away.
        pending: Mark the modem recovery pending and wait until maintenance time.
    In one embodiment of the present invention, the default state is modem recovery maintenance schedule pending.
Module Recovery Maintenance Stop-Time<hh:mm>
    This parameter defines the time of day to stop all recovery maintenance tasks taking place. Some customers have specific maintenance times which they like to fine tune for themselves. This option is useful to users who prefer to increase the maintenance window to increase the odds of successfully reloading the modem module, yet not exceed a certain time in the day for recovery maintenance to be active.

Figure 5:
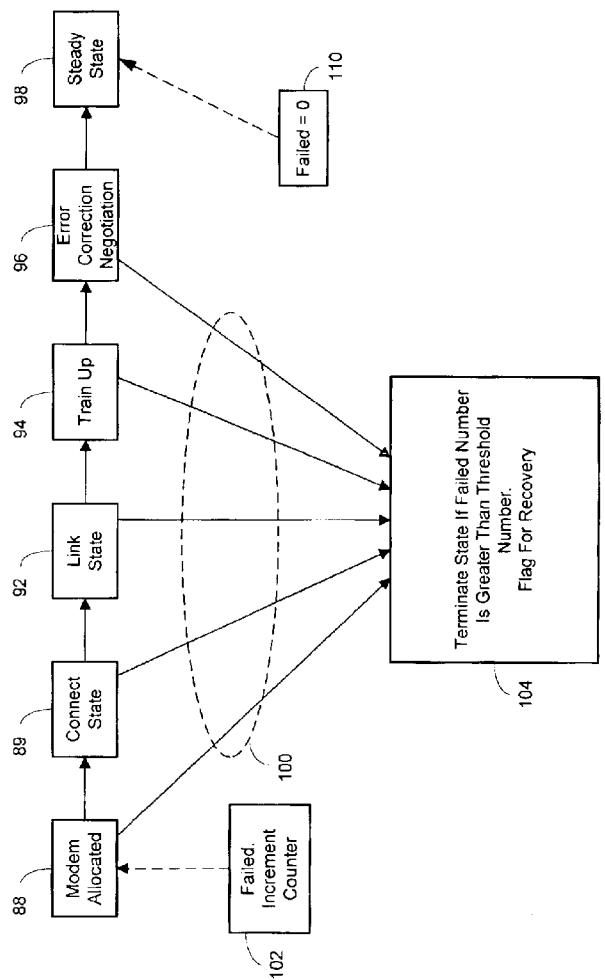
FIG. 5 illustrates, generally, the process of detecting 'bad' modems during the recovery and/or upgrade operations.

The process of detecting bad modems is generally depicted in FIG. 5 during the modems' communication protocol negotiation sequence. At step 88, an incoming call, which could have originated from, for example, the modem 14 (in FIG. 1), is received. The PSTN signals the NAS that a call from a given phone call is waiting on a given timeslot on a given timeslot on a given T1 trunk. The processor 34 allocates a free modem DSP device for the call 88, and couples the modem to the T1 timeslot signal. Thereafter, the modems themselves connect 89, link up 92, and continue to negotiate the specifics of their connection such as speed, modulation, compression, error correction and the like, at 94 and 96 in FIG. 5, until they are finished. For example, if at state 94, it is determined that one of the modems operates at a different speed than the other modem, at state 96, the faster modem may adjust its speed to a lower speed, specifically that of the slower modem's speed or yet a further slower speed, in order to effectively communicate with the latter. Once state 96 is completed, a connection is established between the modems and they function as terminals transferring data between each other. This is referred to as 'steady-state' 98 in FIG. 5.

When steady-state state 98 is reached, a connection is made indicating that the modems are functioning properly. There is a failed counter in processor 34 which keeps track of the number of consecutive failures experienced by the modem or DSP devices. As the modem is allocated, at 88, the failed counter is incremented by one, at 102. When the steady state 98 is reached, which signifies that the modem is functioning properly, the number of failed attempts is set equal to zero, as indicated at 110. However, if the modem does not successfully complete one of any of the states 88 through 96, the connection is terminated and the value of the failed counter remains unchanged. In this case, during the first call to a modem, this value is '1'.

When a second call is allocated to the same modem, the failed counter is incremented by one again to the value 'two' and, as before, if the steady-state 98 is reached, the failed counter is set back to zero at 110 in FIG. 5. Otherwise, the counter remains at the value 'two'. The process of allocating calls to this modem continues in this manner and if it so happens that the failed counter reaches a predetermined threshold value, the modem is deemed defective or 'bad' and is flagged for recovery as shown in 104. The threshold value is configurable and could be changed as desired. An example of the threshold value is twenty allowing for twenty consecutive calls to fail before declaring the modem defective. Setting the threshold to a high value and counting only consecutive failures (as opposed to random and non-consecutive failures) allows for a higher probability of correctly declaring a modem to be defective. The entire process as shown in FIG. 5 is managed by the processor 34.

The number of failed attempts has to be consecutive for the failed counter at 102 to increase. Otherwise, there would at least be one successful attempt which means that steady-state 98 has been reached and the number of failed attempts has been set back to zero at 110. Furthermore, if the attempt to make connection fails at any of the states 88 through 96, the call is terminated, never reaching steady state 98. This is indicated in FIG. 5 at 100 where at any of the states 88 through 96, a call may be terminated and the failed counter is checked against the threshold value. If the number of failed attempts is greater than the threshold number, the modem (or DSP device) is flagged for recovery whereby the recovery process described above will be responsible for reloading the said modem. Otherwise, the failed counter at 102 is simply incremented by one when a new call is allocated to the modem as shown in 88.

While the present invention has been discussed herein with reference to particular embodiments employing DSP devices, other embodiments may be employed without departing from the scope and spirit of the present invention. For instance, rather that a NAS, any embedded system having multiple processors (not necessarily DSP devices) that are grouped in modules and managed by a central processor (such as processor 34) may be employed.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What I claim is:

1. A method for use in a communications system utilized by users of telephone or modem calls, the communications system having more than one processor with a plurality of processors forming a module, each processor for performing various functions by executing code stored in a memory device, the method for upgrading the stored code for any one of the processors or for recovering one or more processors, comprising:

determining one or more of the processors of a particular module to be 'bad';

scheduling recovery of the 'bad' processor;

"busying out" the particular module so that no calls are processed through the particular module; and attempting recovery of the 'bad' processor.

2. A method for use in a communications system as recited in claim 1 wherein during the step of attempting recovery, downloading a particular code to the 'bad' processor and treating the 'bad' processor as operational.

3. A method for use in a communications system as recited in claim 1 wherein the determining step includes waiting a predetermined number of times for calls through the one or more processors to fail prior to the marking step.

4. A method for use in a communications system as recited in claim 1 further including, after the step of determining, marking the bad processors as being in a 'Recover Pending' cannot accept incoming calls.

5. A method for use in a communications system as recited in claim 4 further including the step of recovering the processors that are in 'Recovery Pending' state without adversely affecting the users.

6. A method for use in a communications system as recited in claim 1 further including, after the step of stopping, retrying recovery.

7. A network access server (NAS) for use in a communications system having a first communications device coupled to communicate through a public switching telephone network (PSTN), and a second communications device, coupled to communicate through a packet switching network, the NAS including processors for transferring communications information between the first and the second communications devices wherein the processors require upgrading or recovery comprising:

a modem card coupled to receive telephone calls and operative to generate processed telephone calls including, one or more modules, each module having a module controller, a memory block and a plurality of digital signal processors for executing code, stored in the memory block, to perform various tasks, the module controller coupled to the plurality of digital signal processors for attempting recovery, during upgrading or recovery, of one or more of the digital signal processors of a particular module having been designated as 'bad', wherein the impact of recovery or upgrade of the digital signal processors to the users is minimized while the overall system capacity is maximized.

8. A network access server as recited in claim 7 further including a processor card coupled to said modem card for assigning an in-coming call to one of the digital signal processors of the particular module.

9. A network access server as recited in claim 7 wherein the processors included within the NAS for designating the particular module as being 'bad'.

10. A network access server as recited in claim 7 wherein the packet switching network is he Internet and the network access server further includes an Ethernet connection for coupling the modem card and the processor card to the Internet.

11. A network access server as recited in claim 7 further including a controller card responsive to T1 transmission lines coupling information from the public switch telephone network and operative to provide the modem card and rite processor individual calls for processing.

12. A network access server as recited in claim 7 wherein the information being coupled onto the T1 lines is Time Division Multiplexed.

13. A network access server as recited in claim 7 further including a controller card responsive to E1 transmission lines coupling information from the public switch telephone network and operative to provide the modem card and the processor individual calls for processing.

14. A network access server as recited in claim 7 wherein the information being coupled onto the E1 lines is Time Division Multiplexed.

15. A network access server as recited in claim 7 wherein the processor is further of disabling one or more of the plurality of digital signal processors that have been designated as 'bad'.

16. A network access server as recited in claim 7 further including a failed counter for counting the number of consecutive digital signal processor failures prior to determining the same is 'bad'.

17. A network access server as recited in claim 8 further including a shared bus for coupling the processor and the modem card.

18. A network access server as recited in claim 7 wherein the memory block of the particular module includes code for use by the digital signal processors of the particular module.

19. A network access server as recited in claim 8 wherein the particular module includes separate storage spaces for storing code corresponding to a digital signal processor of the particular module.

20. A network access server as recited in claim 8 wherein said processor includes nonvolatile memory storage space for storing code for use by the digital signal processors and for downloading the code to a 'bad' digital signal processor during upgrading or recovery.

21. A network access server as recited in claim 8 wherein said processor includes a hard disk device for storing code for use by the digital signal processors and for downloading the code to a 'bad' digital signal processor during upgrading or recovery.

22. A network access server as recited in claim 8 wherein code for use by the digital signal processors is stored externally to the NAS.

23. A network access server (NAS) for use in a communications system having a first communications device coupled to communicate through a public switching telephone network (PSTN), and a second communications device, coupled to communicate through a packet switching network, the NAS including processors for transferring communications information between the first and the second communications devices wherein the processors require upgrading or recovery comprising:

means for receiving telephone calls and generating processed telephone calls including,
  module means including one or more modules, each module having a module controller, a memory block and a plurality at digital signal processors for executing code, stored in the memory block, to perform various tasks, the module controller coupled to the plurality of digital signal processors for attempting recovery during upgrading or recovery of one or more of the digital signal processors of a particular module having been designated as 'bad', wherein the impact of recovery or upgrade of the digital signal processors to the users is minimized while the overall system capacity is maximized.

24. A network access server as recited in claim 23 further including a processor card coupled to said modem card for assigning an in-coming call to one of the digital signal processors of the particular module.

25. A network access server as recited in claim 23 wherein the processors included within the NAS for designating the particular module as being 'bad'.

26. A network access server as recited in claim 23 wherein the packet switching network is the Internet and the network access server further includes an Ethernet connection for coupling the modem card and the processor card to the Internet.

27. A network access server as recited in claim 23 further including a controller card responsive to T1 transmission lines coupling information from the public switch telephone network and operative to provide the modem card and the processor individual calls for processing.

28. A network access server as recited in claim 23 wherein the information being coupled onto the T1 lines is Time Division Multiplexed.

29. A network access server as recited in claim 23 further including a controller card responsive to E1 transmission lines coupling information from the public switch telephone network and operative to provide the modem card and the processor individual calls for processing.

30. A network access server as recited in claim 23 wherein the information being coupled onto the E1 lines is Time Division Multiplexed.

31. A network access server as recited in claim 23 wherein the processor is further of disabling one or more of the plurality of digital signal processors that have been designated as 'bad'.

32. A network access server as recited in claim 23 further including a failed counter for counting the number of consecutive digital signal processor failures prior to determining the same is 'bad'.

33. A network access server as recited in claim 24 further including a shared bus for coupling the processor and the modem card.

34. A network access server as recited in claim 23 wherein the memory block of the particular module includes code for use by the digital signal processors of the particular module.

35. A network access server as recited in claim 24 wherein the particular module includes separate storage spaces for storing code corresponding to a digital signal processor of the particular module.

36. A network access server as recited in claim 24 wherein said processor includes nonvolatile memory storage space for storing code for use by the digital signal processors and for downloading the code to a 'bad' digital signal processor during upgrading or recovery.

37. A network access server as recited in claim 24 wherein said processor includes a hard disk device for storing code for use by the digital signal processors and for downloading the code to a 'bad' digital signal processor during upgrading or recovery.

38. A network access server as recited in claim 24 wherein code for use by the digital signal processors is stored externally to the NAS.

* * * * *

UNITED STATES PATENT AND TRADEMARK OFFICE
CERTIFICATE OF CORRECTION

PATENT NO. : 6,958,972 B2
APPLICATION NO. : 10/633003
DATED : October 25, 2005
INVENTOR(S) : Foltak It is certified that error appears in the above-identified patent and that said Letters Patent is hereby corrected as shown below:

At column 17, line 22-23, please replace "modem card and rite processor" with

--modem card and the processor--

Signed and Sealed this

Seventh Day of November, 2006

JON W. DUDAS
*Director of the United States Patent and Trademark Office*